(12) United States Patent
Takatori et al.

(10) Patent No.: US 10,263,806 B2
(45) Date of Patent: Apr. 16, 2019

(54) NETWORK SYSTEM OF RAILCAR

(71) Applicant: KAWASAKI JUKOGYO KABUSHIKI KAISHA, Kobe-shi, Hyogo (JP)

(72) Inventors: Takashi Takatori, Akashi (JP); Katsuhiro Kanbe, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 15/547,661

(22) PCT Filed: Jan. 26, 2016

(86) PCT No.: PCT/JP2016/000367
§ 371 (c)(1),
(2) Date: Jul. 31, 2017

(87) PCT Pub. No.: WO2016/121374
PCT Pub. Date: Aug. 4, 2016

(65) Prior Publication Data
US 2018/0013580 A1    Jan. 11, 2018

(30) Foreign Application Priority Data

Jan. 30, 2015 (JP) .................................. 2015-016521

(51) Int. Cl.
*G06F 13/00* (2006.01)
*H04L 12/46* (2006.01)
(Continued)

(52) U.S. Cl.
CPC ............ *H04L 12/46* (2013.01); *B61L 15/009* (2013.01); *B61L 15/0027* (2013.01);
(Continued)

(58) Field of Classification Search
CPC ..... H04L 12/44; H04L 12/46; H04L 61/2514; H04L 67/12; H04L 67/34; H04L 12/4366;
(Continued)

(56) References Cited

U.S. PATENT DOCUMENTS 7,073,753 B2 *  7/2006  Root .................... B60T 13/662
                                                          246/72
7,317,708 B2 *  1/2008  Moon ............... H04L 29/12367
                                                          370/310
(Continued)

FOREIGN PATENT DOCUMENTS

JP            5595768 B2      9/2014

OTHER PUBLICATIONS

Apr. 19, 2016 Search Report issued in International Patent Application No. PCT/JP2016/000367.

*Primary Examiner* — Kenneth R Coulter
(74) *Attorney, Agent, or Firm* — Oliff PLC

(57) ABSTRACT

The present invention provides a network system of a railcar, the network system being capable of efficiently performing maintenance work. One example of the network system of the railcar of the present invention includes: intra-car networks (N1 to N3) to which first and second apparatuses are connected; an inter-car network (NA) for transmission of information between the apparatuses mounted on different cars; routers (R1 to R3) each provided and connected between the corresponding intra-car network (N1 to N3) and the inter-car network (NA) and each including a network address translation portion configured to mutually convert a private address of the first apparatus and an IP address of the inter-car network (NA); and a maintenance transmission path forming unit configured to form a transmission path through which the transmission and reception of the information are performed between a maintenance terminal (5) and a maintenance target apparatus selected from the first
(Continued)

and second apparatuses, the transmission path not passing through the network address translation portion of the car on which the maintenance target apparatus is mounted.

12 Claims, 10 Drawing Sheets

(51) Int. Cl.
*H04L 12/44* (2006.01)
*B61L 15/00* (2006.01)
*B61L 25/02* (2006.01)
*H04L 29/12* (2006.01)
*H04L 29/08* (2006.01)
*H04L 12/40* (2006.01)

(52) U.S. Cl.
CPC ....... *B61L 15/0036* (2013.01); *B61L 15/0054* (2013.01); *B61L 15/0072* (2013.01); *B61L 15/0081* (2013.01); *B61L 25/02* (2013.01); *H04L 12/44* (2013.01); *H04L 12/4633* (2013.01); *H04L 61/2514* (2013.01); *H04L 67/12* (2013.01); *H04L 67/34* (2013.01); *H04L 61/2007* (2013.01); *H04L 61/2038* (2013.01); *H04L 2012/40293* (2013.01)

(58) Field of Classification Search
CPC ....... H04L 2012/40293; H04L 61/2038; H04L 61/2007; H04L 12/4633; B61L 15/0036; B61L 25/02; B61L 15/0027; B61L 15/0072; B61L 15/0081; B61L 15/009; B61L 15/0054
USPC ........ 709/224, 223, 245, 238, 239, 227–229
See application file for complete search history.

(56) References Cited

U.S. PATENT DOCUMENTS

| | | | |
|---|---|---|---|
| 8,037,204 B2 | 10/2011 | Breton et al. | |
| 8,090,858 B2* | 1/2012 | Poyhonen | H04L 29/06027 370/349 |
| 8,812,688 B2* | 8/2014 | Luukkala | H04W 76/45 709/227 |
| 9,950,718 B2* | 4/2018 | Naylor | B61L 15/0027 |
| 2003/0183729 A1* | 10/2003 | Root | B60T 13/662 246/167 R |
| 2005/0174974 A1* | 8/2005 | Sonntag | H04W 92/20 370/338 |
| 2005/0259598 A1* | 11/2005 | Griffin | B61L 15/00 370/255 |
| 2006/0098614 A1* | 5/2006 | Moon | H04L 29/12367 370/338 |
| 2012/0079111 A1* | 3/2012 | Luukkala | H04W 76/45 709/225 |
| 2014/0359143 A1* | 12/2014 | Luukkala | H04W 76/45 709/227 |
| 2016/0016596 A1* | 1/2016 | Naylor | B61L 15/0027 709/220 |

* cited by examiner

NETWORK SYSTEM OF RAILCAR

TECHNICAL FIELD

The present invention relates to a network system of a railcar.

BACKGROUND ART

In a rail train, states of apparatuses mounted on cars constituting the train are usually monitored by a monitoring device arranged at a head car, and a network is constructed to collect information of the apparatuses of the cars (see PTLs 1 and 2, for example).

When changing a train set of the rail train, the cars are combined or split. Therefore, typically, networks for the respective cars are constructed, and a network for the entire train set is constructed. Hereinafter, the network for each car is referred to as an "intra-car network", and the network for the entire train set is referred to as an "inter-car network."

When changing the train set (when combining or splitting the cars), the intra-car networks are connected to one another or disconnected from one another. Therefore, typically, the intra-car networks serve as local networks, the inter-car network serves as a global network, and these networks are connected to one another through routers.

Normally, a plurality of apparatuses mounted on the car are connected to the intra-car network for, for example, collecting apparatus information, such as an operation log. The apparatus information of all the cars in the train set can be confirmed by the monitoring device of the head car including a driver's seat. For example, when an operation abnormality of the apparatus occurs, it is informed to a driver. Examples of the apparatus information include information indicating operation states of doors, lighting apparatuses, and air conditioners, and information indicating abnormalities of doors, lighting apparatuses, and air conditioners.

When the monitoring device and each of a large number of apparatuses in the other cars communicate with each other to, for example, collect the apparatus information of all the cars, there is a problem that traffic of the inter-car network increases, and throughput of the inter-car network decreases. This problem becomes significant as the number of cars in the train set increases.

Further, when the monitoring device of the head car communicates with each of a large number of apparatuses in the other cars as described above, each router connecting the intra-car network and the inter-car network performs an address translation based on a table (NAT table) that records an address translation method regarding the respective apparatuses. However, when additions, changes, or the like of addresses are required due to, for example, an increase or decrease of the apparatuses, the NAT table needs to be suitably updated. Thus, there is a problem that a labor of managing the NAT table is required. Furthermore, a state where all the apparatuses are accessible from the other cars is not preferable in terms of security.

To avoid these problems, in many cases, monitoring devices each connected to the corresponding intra-car network for information collection are provided at the respective cars, the apparatus information of the cars are collected and processed by the respective monitoring devices, and the inter-car network is used only for communication among the monitoring devices. For example, when the apparatus of the car other than the head car is abnormal, abnormality information is transmitted from the monitoring device of the car through the inter-car network to the monitoring device of the head car. In this case, since the NAT table records only the address translation method regarding the monitoring devices, the labor of managing the NAT table can be reduced, and the deterioration of the security can be suppressed.

CITATION LIST

Patent Literature

PTL 1: U.S. Pat. No. 8,037,204
PTL 2: Japanese Patent No. 5595768

SUMMARY OF INVENTION

Technical Problem

A plurality of apparatuses mounted on the cars are controlled by controllers included in the respective apparatuses. To change control logic or parameters, software (operation programs and parameters of the apparatus) of the controllers need to be updated. In addition, it may be necessary to acquire log information, such as the operation logs of the apparatuses, accumulated (stored) in the controllers of the apparatuses. To update the software or acquire the operation logs, for example, a mobile external terminal (maintenance terminal) needs to be connected by a worker to a maintenance target apparatus. Therefore, the worker needs to move to a place where the maintenance target apparatus exists among the cars in the train set, or when the maintenance target apparatus is located under a floor of the car, the worker needs to work under the floor. Therefore, maintenance work requires a large amount of labor.

Especially, when the inter-car network is used only for the communication among the monitoring devices, the NAT table records only the address translation method regarding the monitoring devices. Therefore, to realize the communication between the maintenance terminal and the maintenance target apparatus, the maintenance terminal is directly connected to the intra-car network to which the maintenance target apparatus is connected.

The present invention was made to solve the above problems, and an object of the present invention is to provide a network system of a railcar, the network system being capable of efficiently performing maintenance work.

Solution to Problem

To achieve the above object, a network system of a railcar according to one aspect of the present invention includes: intra-car networks mounted on a plurality of respective cars of a car train set configured by coupling the cars, at least a corresponding one of first apparatuses and a corresponding one of second apparatuses being connected to each of the intra-car networks, private addresses being given to the respective first and second apparatuses; an inter-car network formed in the entire car train set for transmission and reception of information between the apparatuses mounted on the different cars; routers provided in the respective cars and each connected between the corresponding intra-car network and the inter-car network, the routers each including a network address translation portion configured to perform address translation of mutually converting the private address of the first apparatus and an IP address of the inter-car network when performing the transmission and reception of the information between the apparatuses mounted on the different cars; and a maintenance transmission path forming unit configured to form a transmission path through which the transmission and reception of the information are performed between a maintenance target apparatus selected by an external terminal from the first and second apparatuses mounted on the cars constituting the car train set and the external terminal that is not connected by wire to the intra-car network where the maintenance target apparatus exists, the transmission path not passing through the network address translation portion of the car on which the maintenance target apparatus is mounted.

According to this configuration, the maintenance transmission path forming unit can form the transmission path through which the transmission and reception of the information are performed between the external terminal and the maintenance target apparatus selected from the first and second apparatuses existing in the intra-car network to which the external terminal is not connected by wire, the transmission path not passing through the network address translation portion of the car on which the maintenance target apparatus is mounted. Therefore, the transmission path can be formed even between the external terminal and the second apparatus that cannot be connected to the inter-car network. With this, when performing the maintenance work, the maintenance worker does not have to directly connect the external terminal to the maintenance target apparatus. For example, the maintenance worker carries the external terminal into a car (head car, for example) and can perform the maintenance work in this car with respect to the first and second apparatuses connected to the intra-car networks of the other cars as the maintenance targets without moving to the other cars. Thus, the maintenance work can be performed efficiently. Further, for example, since the communication using the inter-car network while a train is normally running is limited to the communication among the first apparatuses, an increase in traffic of the inter-car network can be suppressed, labor of managing NAT tables of the routers can be reduced, and deterioration of security can be suppressed.

The maintenance transmission path forming unit may include wireless LAN access points connected to the respective intra-car networks and a wireless LAN adapter connected to or incorporated in the external terminal, and the maintenance transmission path forming unit may form the transmission path connecting the external terminal and the intra-car network, where the maintenance target apparatus exists, through the wireless LAN adapter and the corresponding wireless LAN access point.

According to this configuration, the external terminal can be connected to the intra-car network, where the maintenance target apparatus exists, through the wireless LAN adapter and the wireless LAN access point. Therefore, the external terminal can set each of all the first and second apparatuses, connected to the intra-car networks, as the maintenance target apparatus. Further, without carrying the external terminal into the car, the maintenance work can be performed from outside the car.

The maintenance transmission path forming unit may include a VPN client incorporated in the external terminal and connected to any one of the intra-car networks and VPN servers provided in the respective cars and each connected between the corresponding intra-car network and the inter-car network, and the maintenance transmission path forming unit may form the transmission path connecting the external terminal and the intra-car network, where the maintenance target apparatus exists, through the VPN client and the corresponding VPN server.

According to this configuration, the external terminal can be connected to the intra-car network, where the maintenance target apparatus exists, through the VPN client incorporated in the external terminal and the VPN server of the car on which the maintenance target apparatus is mounted. Therefore, the external terminal can set each of all the first and second apparatuses, connected to the intra-car networks, as the maintenance target apparatus.

The external terminal may update software of the maintenance target apparatus through the transmission path formed by the maintenance transmission path forming unit.

The external terminal may receive an operation log of the maintenance target apparatus through the transmission path formed by the maintenance transmission path forming unit.

The first apparatuses of the cars may be monitoring devices each configured to monitor a state of the corresponding second apparatus through the corresponding intra-car network, and transmission and reception of information regarding the state of the second apparatus may be performed among the monitoring devices of the cars through the inter-car network.

Advantageous Effects of Invention

The present invention has an effect of being able to provide a network system of a railcar, the network system being configured as explained above and capable of efficiently performing maintenance work.

DESCRIPTION OF EMBODIMENTS

Hereinafter, preferred embodiments will be explained in reference to the drawings. In the following explanations and drawings, the same reference signs are used for the same or corresponding components, and a repetition of the same explanation is avoided. The present invention is not limited to the following embodiments.

Each of Embodiments 1 and 2 is one example of a network system of a railcar, the network system including a maintenance transmission path forming unit configured to form a transmission path through which transmission and reception of information is performed between a maintenance target apparatus selected by an external terminal and the external terminal that is not connected by wire to an intra-car network where the maintenance target apparatus exists, the transmission path not passing through a network address translation portion of the car on which the maintenance target apparatus is mounted. Embodiment 1 is configured such that the transmission path can be formed in a state where the external terminal is not connected by wire to any of the intra-car networks. On the other hand, Embodiment 2 is configured such that the transmission path can be formed in a state where the external terminal is connected by wire to any one of the intra-car networks. In addition, Embodiment 2 is configured such that when the apparatus existing in the intra-car network to which the external terminal is connected by wire is the maintenance target apparatus, the maintenance transmission path forming unit can form the transmission path through which the transmission and reception of the information are performed between the external terminal and the maintenance target apparatus existing in the intra-car network to which the external terminal is connected by wire, the transmission path not passing through the network address translation portion of the car on which the maintenance target apparatus is mounted.

Embodiment 1

Figure 1:
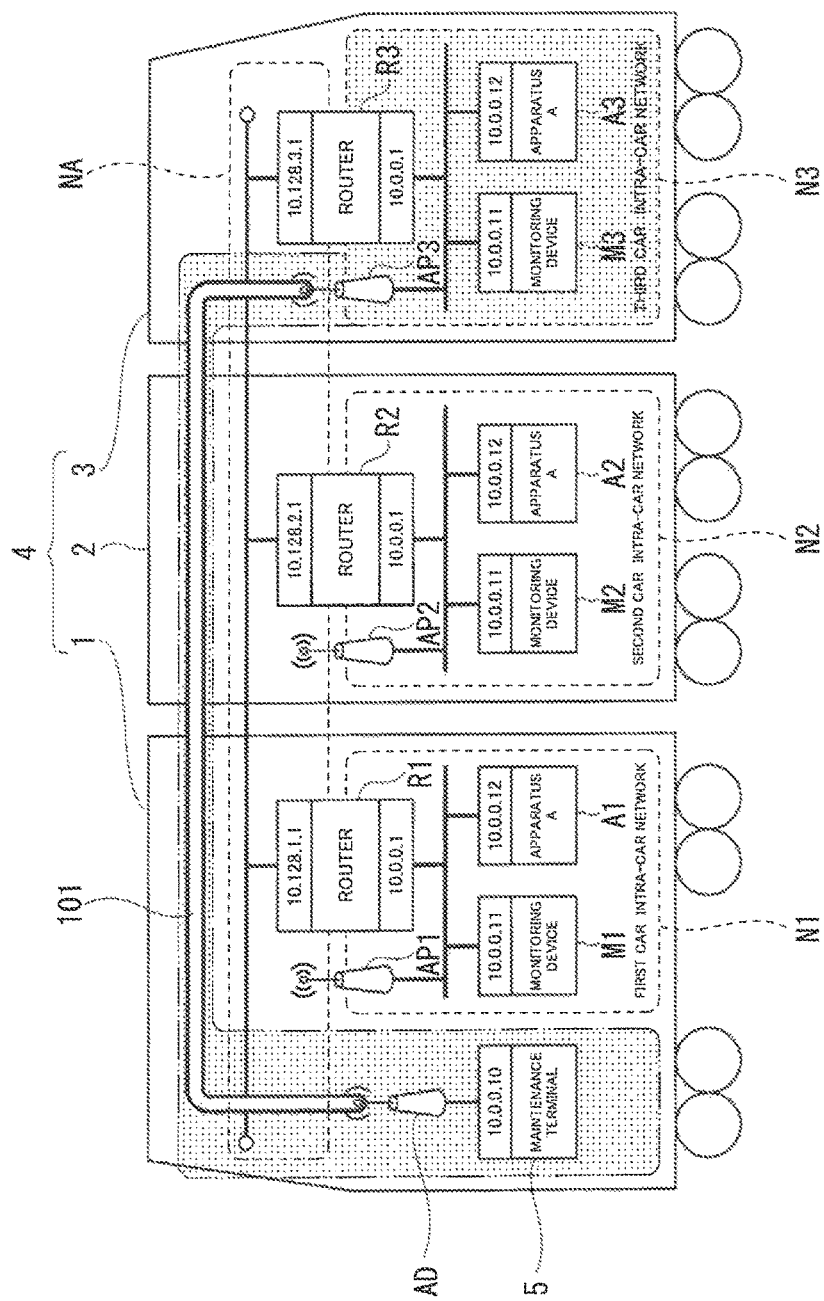
FIG. 1 is a diagram schematically showing a train on which a network system of a railcar of one example of Embodiment 1 is mounted.

FIG. 1 is a diagram schematically showing a train on which a network system of a railcar of one example of Embodiment 1 is mounted.

A car train set (train) 4 shown in FIG. 1 is configured by coupling a plurality of cars 1 to 3. A proceeding direction of the cars 1 to 3 is a direction toward a left side on a paper surface of FIG. 1, and the cars 1 to 3 are a first car (head car; end car), a second car (middle car), and a third car (last car; end car), respectively. It should be noted that the number of cars in the train set is not limited to this.

In each of the cars 1 to 3, an intra-car network (N1 to N3) is configured by connecting: a monitoring device M (M1 to M3) that is a first apparatus; an apparatus A (A1 to A3) that is a second apparatus; and a wireless LAN access point AP (AP1 to AP3). In FIG. 1, only the apparatus A is shown as the second apparatus, but a plurality of apparatuses (apparatuses A, B, C, etc.) are connected to the intra-car network (N1 to N3). The apparatuses A, B, C, or the like are the same type of apparatuses (such as door open/close apparatuses, air conditioners, lighting apparatuses, or car controllers) mounted on the respective cars, and controllers included in the respective apparatuses are connected to the corresponding intra-car networks N1 to N3. For example, Ethernet (trademark) may be used as a standard of the intra-car network (N1 to N3).

Further, an inter-car network NA for transmitting information among the monitoring devices M1 to M3 is configured in the entire car train set 4. A router (R1 to R3) connecting the intra-car network (N1 to N3) and the inter-car network NA is provided at the car (1 to 3). The router (R1 to R3) records a NAT table regarding only the monitoring device (M1 to M3) connected to the intra-car network (N1 to N3), and communication using the inter-car network NA is performed only among the monitoring devices M1 to M3.

While the train is running, states of the apparatuses (the above apparatuses A, B, etc.) mounted on the car (1 to 3) are transmitted through the intra-car network (N1 to N3) to the monitoring device (M1 to M3) of the car (1 to 3). For example, the monitoring device (M1 to M3) extracts operation information, such as abnormality information (one of apparatus information) indicating an abnormal operation of the apparatus or normal operation information, of a monitoring target from the apparatus information acquired from the apparatus.

The monitoring device (M2, M3) of the car other than the head car transmits the operation information of the monitoring target apparatus through the inter-car network NA to the monitoring device M1 of the head car. A display device (not shown) is connected to the monitoring device M1 of the head car and visually displays the operation information of the apparatus. For example, if opening or closing of a door or lighting of a lighting apparatus is abnormal while the train is running, the display device of the monitoring device M1 of the head car displays the abnormality information transmitted from the monitoring device (M2, M3) and outputs a warning sound to inform the driver of the abnormality of the apparatus.

As above, while the train is running, the communication among the monitoring devices M1 to M3 is performed through the inter-car network NA, and the monitoring device M1 of the head car collects the apparatus information of all the cars to display the apparatus information, such as the abnormality information, on the display device.

Regarding private IP addresses in the intra-car networks N1 to N3, the same address is assigned to the same type of apparatuses and devices. For example, an address "10.0.0.11" is assigned to the monitoring devices M1 to M3, and an address "10.0.0.12" is assigned to the apparatuses A1 to A3.

Figure 2:
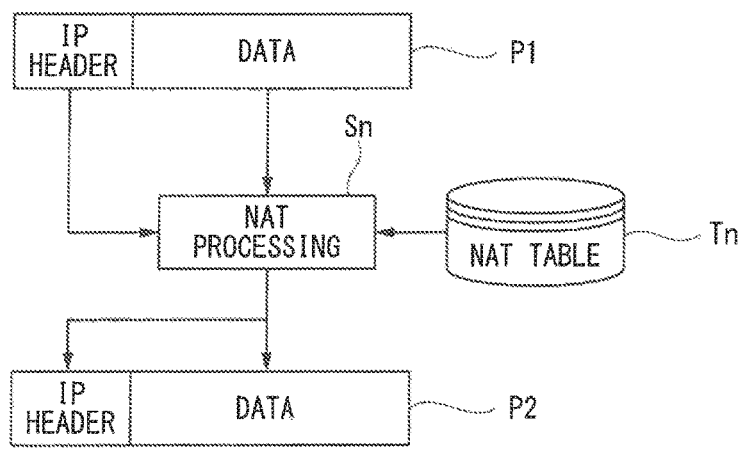
FIG. 2 is a diagram for explaining NAT processing.
Figure 3:
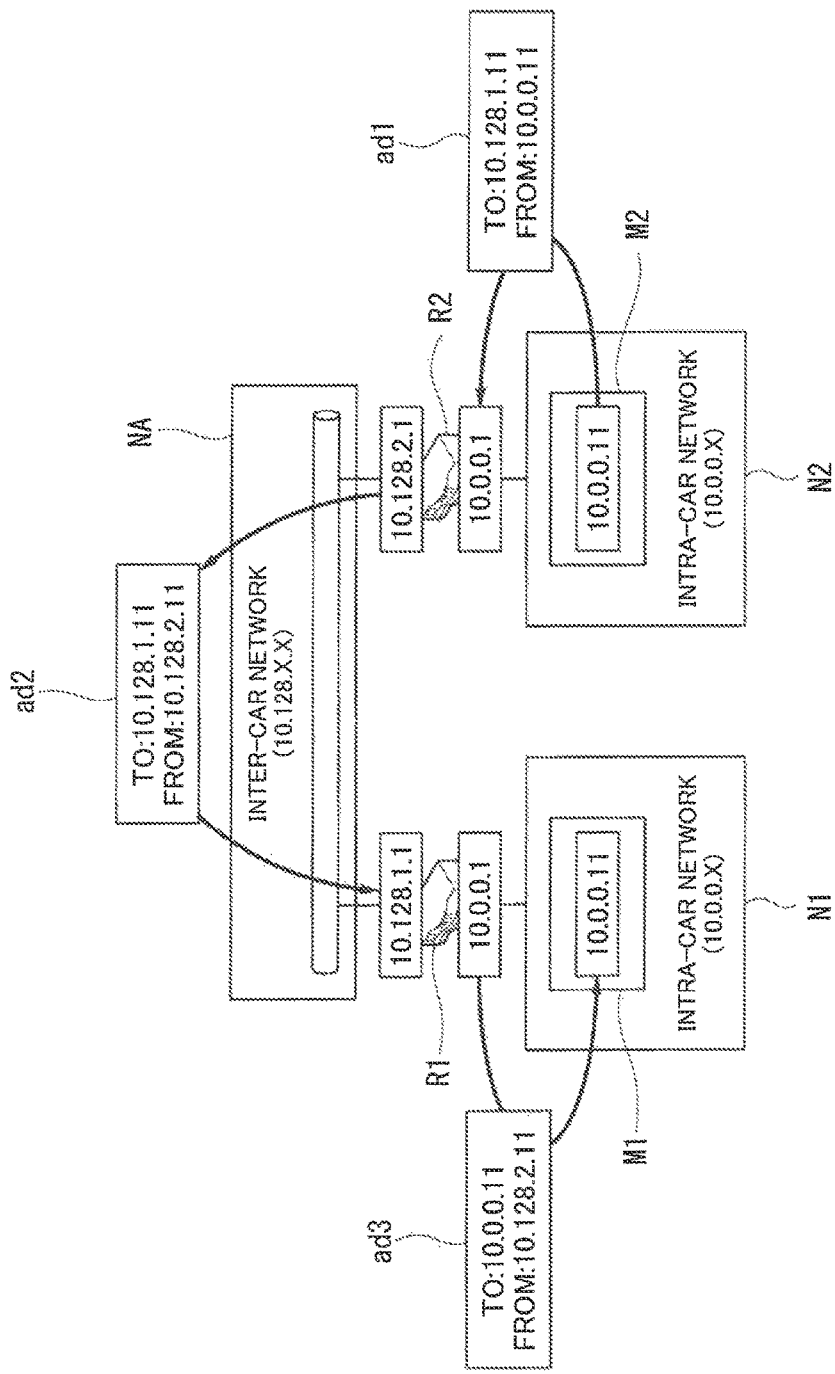
FIG. 3 is a schematic diagram showing one example of the NAT processing.

The following will explain network address translation processing (NAT processing) performed by the router (R1 to R3) when the communication among the monitoring devices (M1 to M3) is performed through the inter-car network NA. FIG. 2 is a diagram for explaining the NAT processing. FIG. 3 is a schematic diagram showing one example of the NAT processing.

As shown in FIG. 2, NAT processing Sn by the router is performed based on a NAT table Tn. In FIG. 2, for example, the NAT processing Sn when the router receives a packet P1 from the inter-car network NA is performed in such a manner that: a destination address (global IP address) contained in an IP header of the packet P1 is converted into a private IP address based on the NAT table Tn; and the obtained packet P2 is sent to the intra-car network. In contrast, when the router receives the packet P1 from the intra-car network, a transmission source address (private IP address) contained in the IP header of the packet P1 is converted into the global IP address based on the NAT table Tn, and the obtained packet P2 is sent to the inter-car network NA. In this example, the NAT table Tn records only the address translation method regarding the monitoring device.

As one example, FIG. 3 shows the NAT processing when information is transmitted from the monitoring device M2 connected to the intra-car network N2 of the second car to the monitoring device M1 connected to the intra-car network N1 of the head car (first car).

In FIG. 3, address information ad1 indicates the destination address and the transmission source address contained in the IP header of a packet to be sent from the monitoring device M2 of the second car to the intra-car network N2. Address information ad2 indicates the destination address and the transmission source address contained in the IP header of a packet to be sent to the inter-car network NA, the packet being obtained in such a manner that the router R2 performs the NAT processing with respect to the packet sent from the monitoring device M2. Address information ad3 indicates the destination address and the transmission source address contained in the IP header of a packet to be sent to the intra-car network N1 of the first car, the packet being obtained in such a manner that the router R1 performs the NAT processing with respect to the packet sent from the inter-car network NA. In the address information ad1 to ad3, the destination address is shown after "TO:," and the transmission source address is shown after "FROM:."

As is clear from a comparison between the address information ad1 and the address information ad2, the transmission source address is converted and rewritten by the NAT processing of the router R2. Further, as is clear from a comparison between the address information ad2 and the address information ad3, the destination address is converted and rewritten by the NAT processing of the router R1.

As above, while the train is normally running, the communication among the monitoring devices M1 to M3 is performed.

Next, the following will explain a case where maintenance work is performed using a maintenance terminal (external terminal) 5. As described above, examples of the maintenance work include: the update of the software of the controllers of the apparatuses mounted on the cars; and the acquisition of the log information, such as the operation log, from the controllers of the apparatuses.

The maintenance terminal 5 is a mobile personal computer, such as a notebook computer, that is portable. The maintenance terminal 5 includes: a display portion constituted by a display; an input portion constituted by a keyboard and the like; and a control portion constituted by a CPU, a memory, and the like. Programs (maintenance software) for the maintenance work, necessary information, and the like are stored in the memory of the control portion in advance. The control portion receives an input command from the input portion to control the display portion.

A maintenance worker can perform the maintenance work by operating the input portion of the maintenance terminal 5 to give the input command to the control portion. Further, the information and the like necessary for the maintenance worker to operate the input portion are displayed on a screen of the display portion by the control of the control portion. Therefore, the maintenance worker can operate the input portion to perform the maintenance work while viewing the screen of the display portion.

In the present embodiment, the wireless LAN access points AP1 to AP3 are connected to the intra-car networks N1 to N3, respectively. A wireless LAN adapter AD is connected to the maintenance terminal 5. It should be noted that the wireless LAN adapter AD may be incorporated in the maintenance terminal 5.

SSIDs (identifiers) that are different from one another are set in the respective wireless LAN access points AP1 to AP3, and the wireless LAN access points AP1 to AP3 transmits the SSIDs as beacons.

In the present embodiment, the maintenance transmission path forming unit includes the wireless LAN access points AP1 to AP3 and the wireless LAN adapter AD and forms the transmission path connecting the maintenance terminal 5 with the intra-car network (N1 to N3), where the maintenance target apparatus exists, through the wireless LAN adapter AD and the wireless LAN access point (AP1 to AP3). With this, the maintenance transmission path forming unit can form the transmission path through which the transmission and reception of the maintenance information are performed between the maintenance terminal 5 and the maintenance target apparatus without using the NAT function of the router (R1 to R3) on which the maintenance target apparatus is mounted.

FIG. 1 shows a case where: the maintenance terminal 5 is carried into the car 1 that is the first car; and the apparatus (such as the monitoring device M3 or the apparatus A3) mounted on the car 3 that is the third car is the maintenance target apparatus. The wireless LAN adapter AD is connected to the maintenance terminal 5, and like an infrastructure mode of a wireless LAN, the maintenance terminal 5 is directly connected to the intra-car network N3 of the third car through the wireless LAN access point AP3. This connection state is schematically shown by a white blank thick line 101 in FIG. 1, and the thick line 101 does not actually exist.

When the maintenance worker operates the input portion of the maintenance terminal 5 to select the car (third car) on which the maintenance target apparatus is mounted, the maintenance terminal 5 sets the same SSID as the wireless LAN access point AP3 of the third car. With this, the maintenance terminal 5 is connected to the intra-car network N3 of the third car. It should be noted that the maintenance terminal 5 stores the SSIDs of the wireless LAN access points AP1 to AP3 of the cars 1 to 3 in advance.

Next, the maintenance worker operates the input portion of the maintenance terminal 5 to select the maintenance target apparatus among the apparatuses mounted on the car 3 that is the third car. With this, the maintenance terminal can communicate with the maintenance target apparatus. In this communication, the private IP address of the maintenance target apparatus is required. Here, the same address is assigned to the same type of apparatuses mounted on the cars and is stored in the maintenance terminal 5 in advance.

In this case, since the maintenance terminal 5 is logically and directly connected to the intra-car network N3 of the third car, the maintenance terminal 5 can communicate with all the apparatuses connected to the intra-car network N3 of the third car.

When updating the software (the operation programs and parameters of the maintenance target apparatus) of the controller of the maintenance target apparatus (apparatus A3, for example) as the maintenance work, the information for this update is transmitted from the maintenance terminal 5 to the maintenance target apparatus as the maintenance information. Further, when acquiring the log information, such as the operation log, from the controller of the maintenance target apparatus (apparatus A3, for example) as the maintenance work, the log information stored in a memory or the like regarding the operating state of the maintenance target apparatus is transmitted from the maintenance target apparatus to the maintenance terminal 5 as the maintenance information.

Similarly, the maintenance terminal 5 can communicate with all the apparatuses connected to the intra-car networks N1 and N2 and can transmit the maintenance information to and receive the maintenance information from the selected maintenance target apparatus.

Therefore, according to the present embodiment, when performing the maintenance work, the maintenance worker does not have to directly connect the maintenance terminal 5 to the maintenance target apparatus. For example, the maintenance worker carries the maintenance terminal 5 into a car (head car, for example) and can perform the maintenance work in this car with respect to all the apparatuses (including the monitoring devices) connected to the intra-car networks N1 to N3 as the maintenance targets without moving to the other cars. Thus, the maintenance work can be performed efficiently. Further, since the communication using the inter-car network NA while the train is normally running is limited to the communication among the monitoring devices, an increase in traffic of the inter-car network NA can be suppressed, labor of managing the NAT tables of the router R1 to R3 can be reduced, and deterioration of security can be suppressed.

When performing the communication in a case where the maintenance target apparatus is an apparatus in the car into which the maintenance terminal 5 has been carried, the maintenance terminal 5 may be connected by wire to the intra-car network (in the example of FIG. 1, the intra-car network N1 of the head car 1) of the car where the maintenance terminal 5 exists.

According to the present embodiment, without carrying the maintenance terminal 5 into the car, the maintenance work can be performed from outside the car.

Further, according to the present embodiment, regarding the private IP addresses of the apparatuses connected to the intra-car networks, the same address is assigned to the same type of apparatuses, and the maintenance terminal 5 stores the addresses. However, the present embodiment is not limited to this. For example, the IP address may be specified from names of the apparatuses using a name resolution means, such as DNS or NetBIOS over TCP/IP. Further, a method, such as DHCP, of dynamically assigning the IP address may be adopted. In this case, the IP address needs to be assigned so as not to overlap the IP address of the maintenance terminal 5. For this purpose, the IP address of the maintenance terminal 5 may be fixed and excluded from targets for dynamic assigning, or the IP address of the maintenance terminal 5 may also be assigned using a dynamic assigning function.

Embodiment 2

Figure 4:
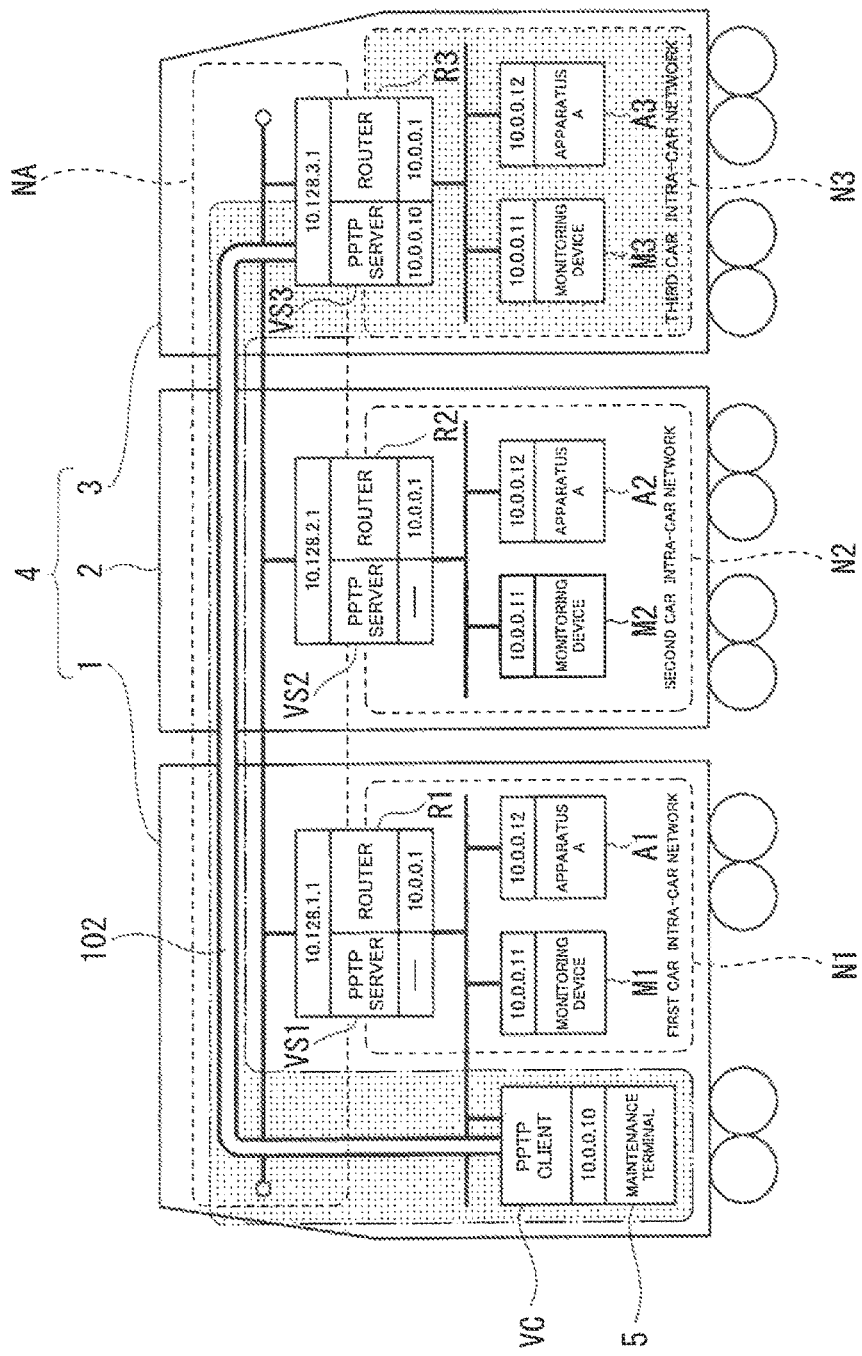
FIG. 4 is a diagram schematically showing a train on which the network system of the railcar of one example of Embodiment 2 is mounted.

FIG. 4 is a diagram schematically showing a train on which a network system of a railcar of one example of Embodiment 2 is mounted. The same reference signs are used for the same or corresponding components as in FIG. 1, and detailed explanations thereof are omitted.

In the present embodiment, as with Embodiment 1, the intra-car networks N1 to N3 are configured in the cars 1 to 3, respectively, and the inter-car network NA for transmitting information among the monitoring devices M1 to M3 is configured in the entire car train set 4. The router (R1 to R3) connecting the intra-car network (N1 to N3) and the inter-car network NA is provided at the car (1 to 3). The router (R1 to R3) records the NAT table regarding only the monitoring device (M1 to M3) connected to the intra-car network (N1 to N3), and the communication using the inter-car network NA is performed only among the monitoring devices M1 to M3.

Unlike Embodiment 1, the wireless LAN access points AP1 to AP3 are not provided in the present embodiment, and each of the routers R1 to R3 is provided with a PPTP (Point to Point Tunneling Protocol) server (VS1 to VS3) as a VPN (virtual private network) server. Further, unlike Embodiment 1, the wireless LAN adapter AD is not connected to the maintenance terminal 5, and the maintenance terminal 5 is provided with a PPTP client VC as a VPN client. Since the PPTP server (VS1 to VS3) can be implemented as software that operates on hardware of the router (R1 to R3), additional hardware may be unnecessary. The PPTP client VC is implemented as software that operates on hardware of the maintenance terminal 5.

In the present embodiment, the maintenance transmission path forming unit includes: the PPTP client VC that is one example of the VPN client; and the PPTP servers VS1 to VS3 each of which is one example of the VPN server. The maintenance transmission path forming unit forms the transmission path connecting the maintenance terminal 5 with the intra-car network (N1 to N3), where the maintenance target apparatus exists, through the PPTP client VC and the PPTP server (VS1 to VS3). With this, the maintenance transmission path forming unit can form the transmission path through which the transmission and reception of the maintenance information are performed between the maintenance terminal 5 and the maintenance target apparatus without using the NAT function of the router (R1 to R3) on which the maintenance target apparatus is mounted. The present embodiment explains an example in which PPTP is used to construct VPN. However, other similar methods capable of constructing the VPN may be used.

As with Embodiment 1, in the present embodiment, while the train is running, the communication among the monitoring devices M1 to M3 is performed through the inter-car network NA, the apparatus information of all the cars are collected by the monitoring device M1 of the head car, and the operation information of the monitoring target apparatus and the like are displayed on the display device (not shown) connected to the monitoring device M1.

Next, the following will explain a case where the maintenance work is performed using the maintenance terminal 5. In this case, the maintenance worker carries the maintenance terminal 5 into the car 1 that is the first car and connects the maintenance terminal 5 by wire to the intra-car network N1 of the first car.

As one example, FIG. 4 shows a case where: the maintenance terminal 5 is carried into the car 1 that is the first car and connected by wire to the intra-car network N1 of the first car; and the apparatus (such as the monitoring device M3 or the apparatus A3) mounted on the car 3 that is the third car is the maintenance target apparatus. It should be noted that as long as the maintenance terminal 5 and the intra-car network can be connected by wire to each other, the maintenance terminal 5 does not necessarily have to be carried into the car.

The maintenance worker operates the input portion of the maintenance terminal 5 to select one maintenance target apparatus. For example, when the apparatus A3 of the third car (car 3) is selected as the maintenance target apparatus, the maintenance terminal 5 incorporating the PPTP client VC establishes the below-described tunnel and session with the router R3 incorporating the PPTP server VS3 in the third car. Thus, the maintenance terminal 5 can communicate with the apparatus A3 and can transmit and receive the maintenance information. At this time, the communication is performed between the PPTP client VC of the maintenance terminal 5 and the PPTP server VS3 of the third car. This state is shown by a white blank thick line 102 in FIG. 4, and the thick line 102 does not actually exist.

Unlike Embodiment 1, an additional communication path is not provided in the present embodiment, and the communication (monitor communication) among the monitoring devices while the train is normally running and the communication during the maintenance work are performed by using the same communication path (inter-car network NA). Therefore, the routers need to appropriately process the packets.

Figure 5:
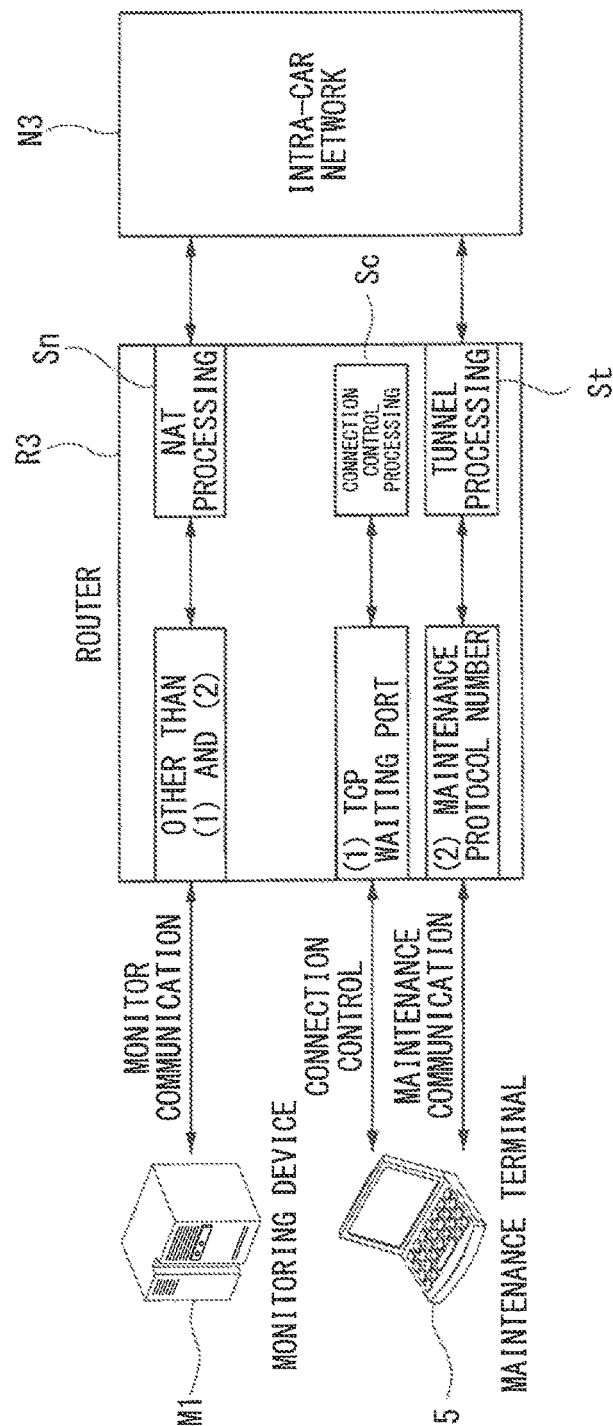
FIG. 5 is a schematic diagram for explaining processing performed by a router incorporating a PPTP server in Embodiment 2.
Figure 6:
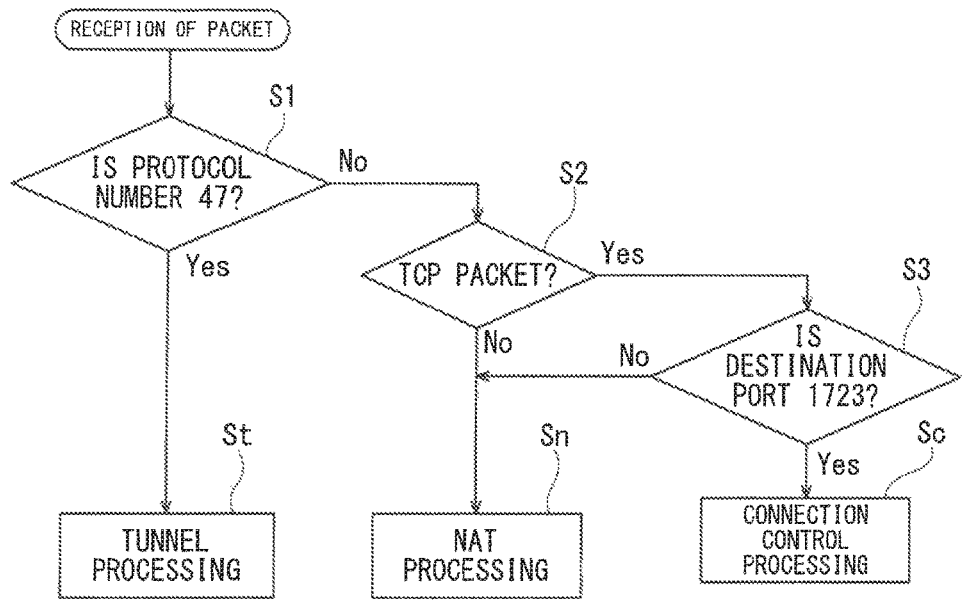
FIG. 6 is a flow chart showing processing performed when the router receives a packet through the inter-car network in Embodiment 2.

FIG. 5 is a schematic diagram for explaining processing performed by the router incorporating the PPTP server. FIG. 6 is a flow chart showing processing performed when the router receives the packet through the inter-car network NA.

The communication of the PPTP can be roughly classified into two types (a) and (b).

(a) Communication for establishing the tunnel and the session using TCP/IP (b) Communication using a PPTP tunneling protocol The PPTP client VC (maintenance terminal 5) establishes the tunnel and the session with the PPTP server operating in the router using the type (a), and then accesses the apparatus (maintenance target) in the intra-car network using the type (b).

As shown in FIG. 6, through Steps S1 to S3, the router performs tunnel processing St in a case where a protocol number of the received packet is 47. Further, the router performs connection control processing Sc in a case where a destination port number of the received packet is 1723. In the other cases, the received packet is a packet for the communication (monitor communication) among the monitoring devices, so that the router performs the NAT processing Sn. This is schematically shown in FIG. 5. As one example, FIG. 5 shows the communication between the monitoring device M1 of the first car and the router R3 incorporating the PPTP server in the third car and the communication between the maintenance terminal 5 and the router R3.

Figure 7:
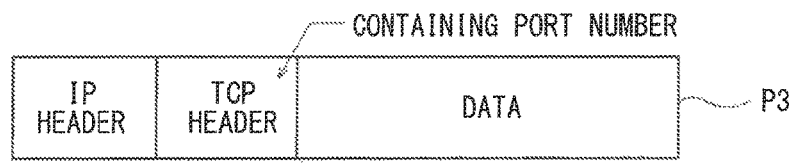
FIG. 7 is a diagram showing the packet when performing connection control processing in Embodiment 2.

FIG. 7 is a diagram showing the packet when performing the connection control processing Sc. The destination port number contained in a TCP header of a packet P3 is 1723.

Figure 8:
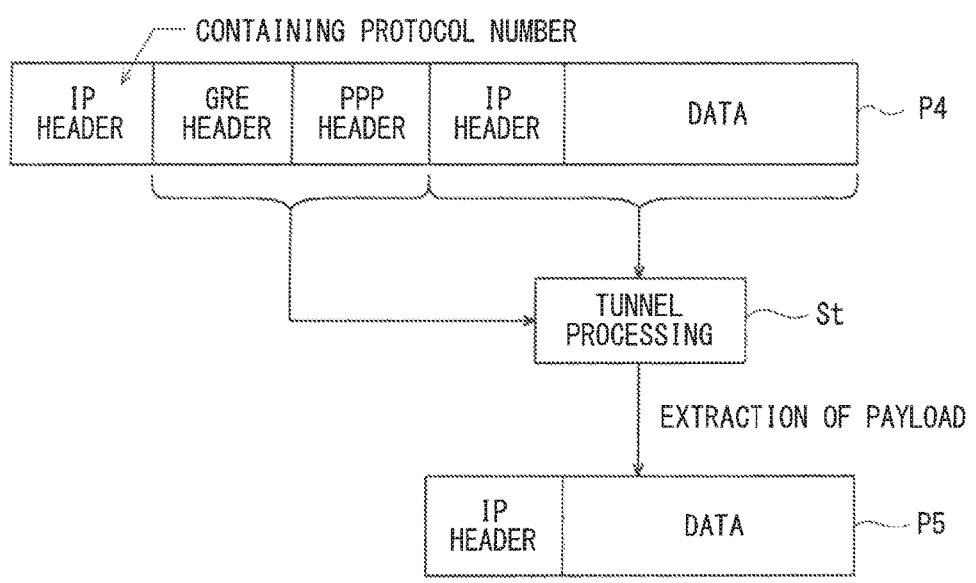
FIG. 8 is a diagram for explaining tunnel processing in Embodiment 2.

FIG. 8 is a diagram for explaining the tunnel processing St. The packet received by the router from the inter-car network NA is a packet P4 shown in FIG. 8. When the protocol number contained in a first IP header is 47, the packet P4 is a tunneling packet. The router extracts a payload from the tunneling packet P4. Processing of extracting the payload from the tunneling packet P4 is the tunnel processing St, and the extracted payload is an original packet P5.

Each of the connection control processing Sc and the tunnel processing St is performed by the PPTP server (VS1 to VS3) of the router (R1 to R3).

Figure 9:
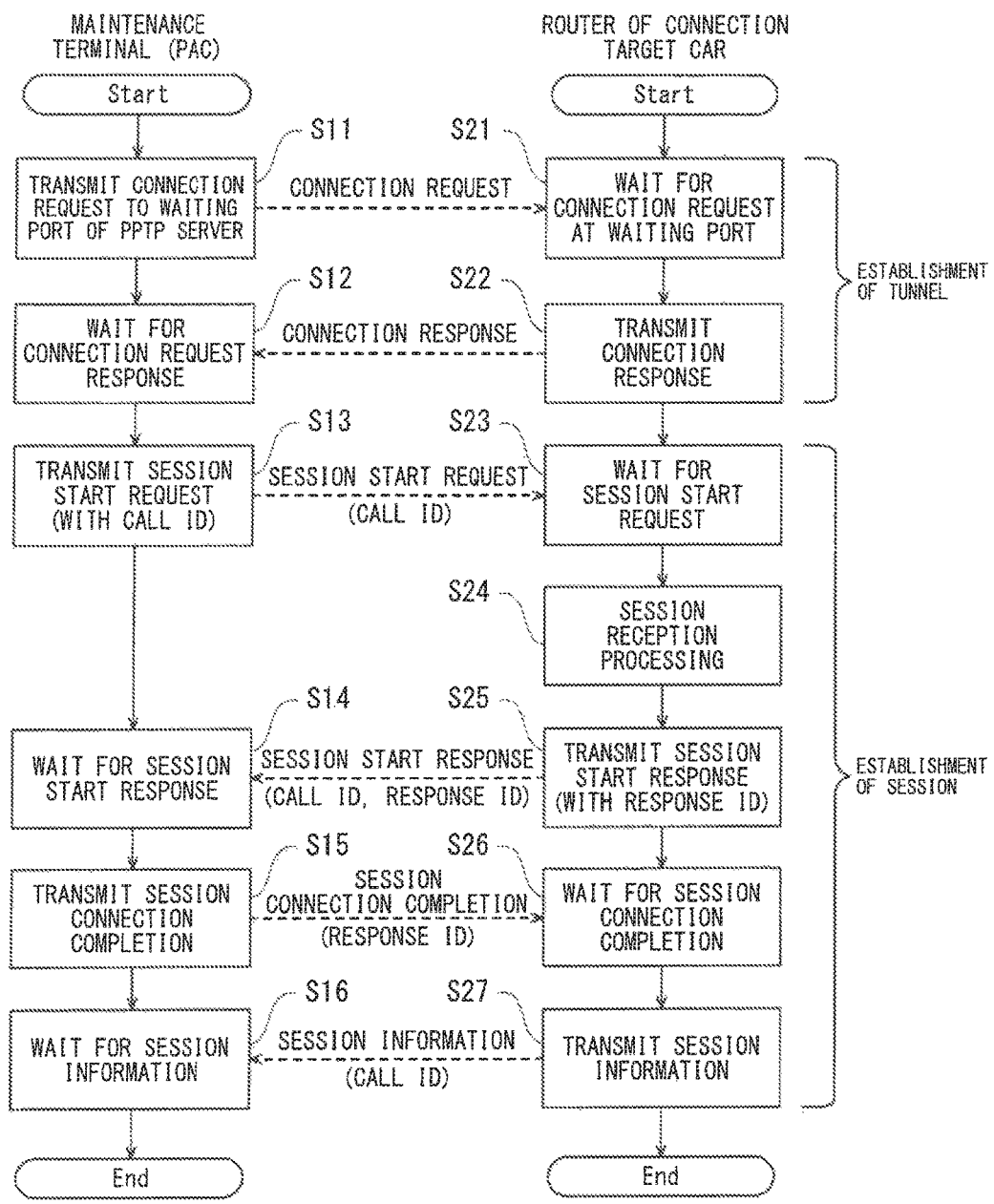
FIG. 9 is a flow chart showing an outline of a procedure of establishing a tunnel and a session in Embodiment 2.

FIG. 9 is a flow chart showing an outline of a procedure of establishing the tunnel and the session using the above type (a), and processing (Steps S21 to S27) performed by the router is the connection control processing Sc. The router and the PPTP server in the following explanation correspond to the router (R1 to R3) connected to the intra-car network to which the maintenance target apparatus is connected and the PPTP server (VS1 to VS3) incorporated in this router, respectively.

The PPTP client VC of the maintenance terminal 5 transmits a connection request, in which the destination port number is 1723 (1723 in the case of the PPTP), by TCP to a waiting port of the router that is a connection target (Step S11). The router receives the connection request (Step S21) and determines that it is the connection request based on the destination port number. The router processes the packet by a processing routine of the PPTP server and returns a connection response (success/failure) to the PPTP client VC (Step S22). The PPTP client VC receives the connection response (Step S12). If the connection request is a success, the PPTP client VC then transmits a session start request (Step S13). The session start request contains "call ID" for identification. The PPTP server receives the session start request, performs reception processing of the session start request, and returns a session start response (success/failure) (Step S23 to S25). The session start response contains "call ID" and "response ID" for identification. The PPTP client VC receives the session start response. When the session start response is a success, the PPTP client VC transmits a session connection completion (Steps S14 and S15). The session connection completion contains "response ID" for identification. The PPTP server receives the session connection completion and returns session information (communication option) which can be used in this session (Steps S26 and S27). The session information contains "call ID" for identification. It should be noted that a plurality of sessions can be established according to need.

The PPTP client VC receives the session information (Step S16). After the session is established, the PPTP client VC performs communication using the tunneling protocol (protocol number 47 in the case of the PPTP) of the above-described type (b). It should be noted that authentication processing (such as CHAP), enciphering procedure (such as RC4), or the like may also be used according to need.

Next, the following will explain the flow of the packet after the tunnel and the session are established. As one example, the packet in the communication between the maintenance terminal 5 and the apparatus A3 of the third car (car 3) will be explained.

Figure 10:
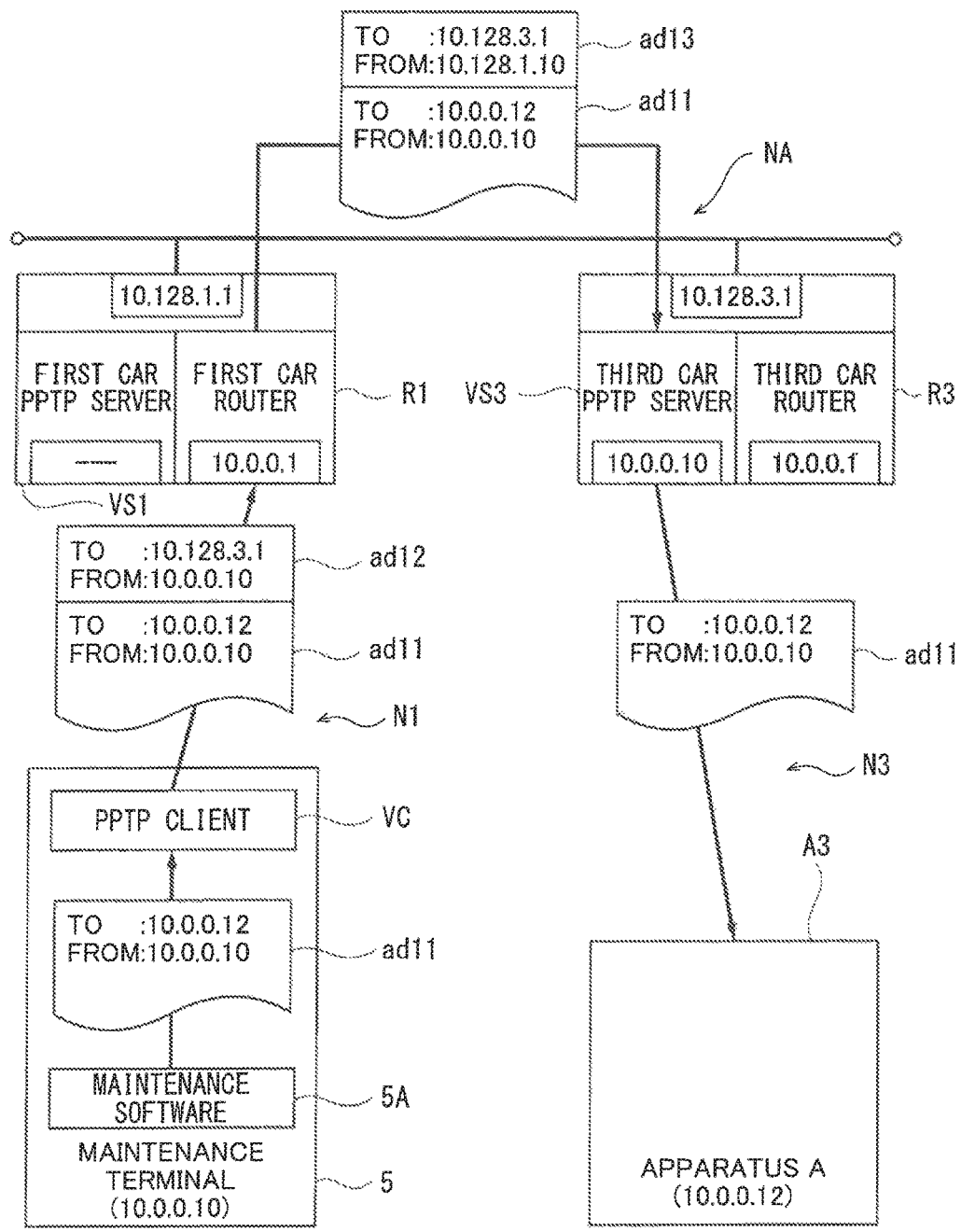
FIG. 10 is a diagram for explaining a flow of the packet when a maintenance terminal of a first car sends the packet to an apparatus of a third car in Embodiment 2.

FIG. 10 is a diagram for explaining the flow of the packet when the packet is sent from the maintenance terminal 5 connected to the intra-car network N1 of the first car to the apparatus A3 of the third car. In this case, the PPTP server VS1 of the first car and the original router R3 of the third car except for the PPTP server VS3 are not involved in the transmission of this packet, the PPTP server VS1 and the original router R3 being shaded in FIG. 10. In FIG. 10, in address information ad11 to ad13 contained in the headers of the packets, the destination address is shown after "TO:," and the transmission source address is shown after "FROM:."

In addition to the maintenance software 5A that is the program for performing the maintenance work, the PPTP client VC as software is implemented in the maintenance terminal 5 as described above.

First, the maintenance software 5A operating in the maintenance terminal 5 generates a packet addressed to the apparatus A3 (10.0.0.12) and sends the packet to the PPTP client VC. The PPTP client VC newly adds a header (header containing the address information ad12), addressed to the third car, to the packet from known tunnel information and session information to generate the tunneling packet, and transmits the tunneling packet to the router R1 of the first car.

The router R1 of the first car processes by the NAT function the received tunneling packet addressed to the third car, rewrites the transmission source address to the global IP address of the maintenance terminal 5, and sends the tunneling packet to the inter-car network NA. At this time, only the header added as the tunneling packet is rewritten, and the original packet generated by the maintenance software 5A is not rewritten. Therefore, only the address information ad12 is rewritten to the address information ad13.

The tunneling packet is sent through the inter-car network NA to the router R3 that is the hardware of the third car. Since the protocol number of the header of the tunneling packet is a specific number (47), the tunneling packet is sent to the PPTP server VS3. The PPTP server VS3 of the third car removes the header of the tunneling packet, takes out the original packet generated by the maintenance software 5A (the above-described tunnel processing St), and sends the packet to the apparatus A3 in the intra-car network N3 of the third car.

The PPTP server VS3 of the third car uses the same private IP address as the maintenance terminal 5 so as to be able to appropriately process the packet transmitted from the apparatuses of the intra-car network N3 of the third car to the maintenance terminal 5. To be specific, as in this example, in a case where the PPTP server VS3 and the router R3 operate in the same network apparatus, and the network apparatus is connected to the intra-car network N3 through a single line, the line uses a plurality of IP addresses (in FIG. 10, the line has two IP addresses that are 10.0.0.1 of the router R3 and 10.0.0.10 of the PPTP server VS3).

Figure 11:
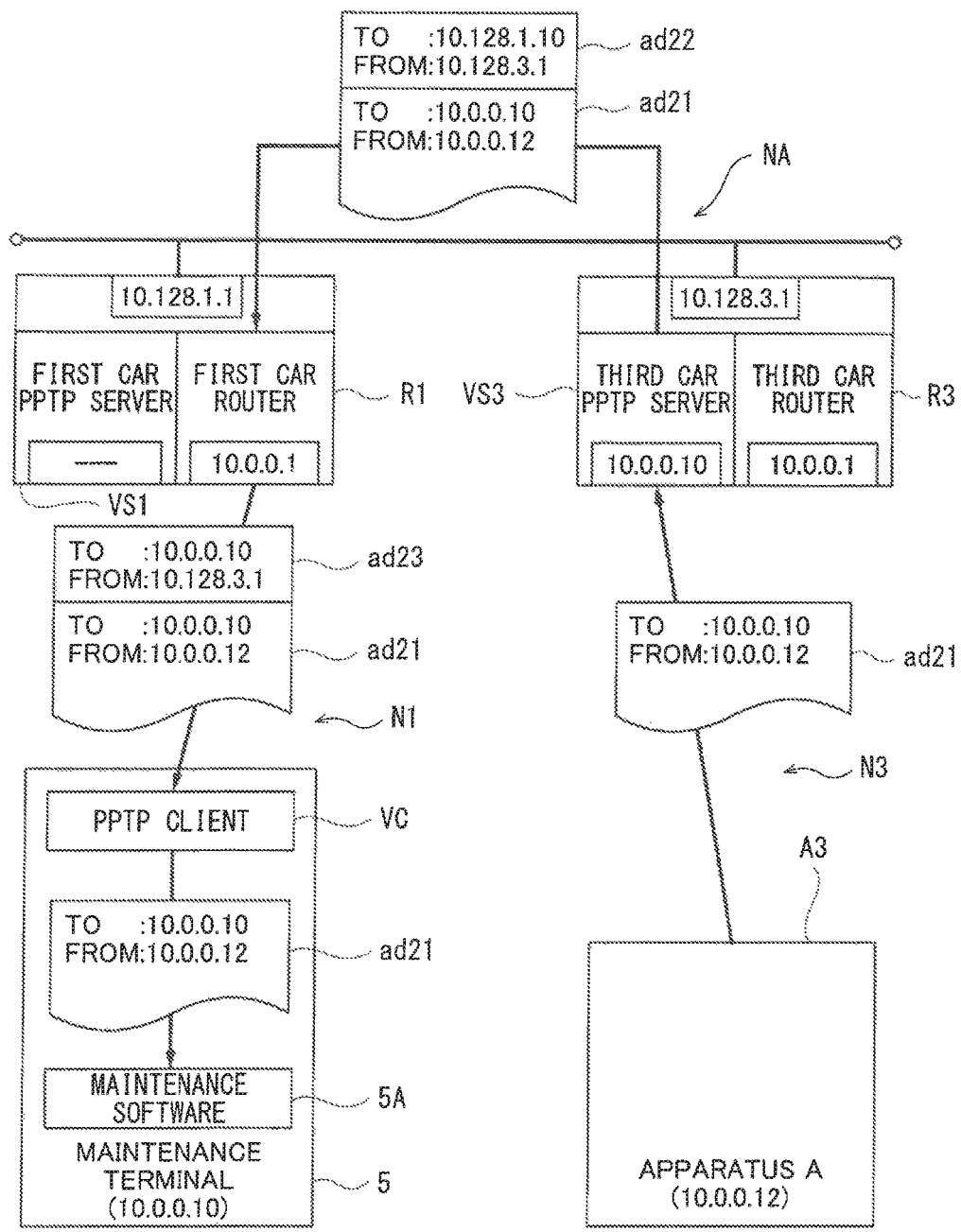
FIG. 11 is a diagram for explaining a flow of the packet when the apparatus of the third car sends the packet to the maintenance terminal of the first car in Embodiment 2.

Next, FIG. 11 is a diagram for explaining the flow of the packet when the packet is sent from the apparatus A3 of the third car to the maintenance terminal 5 connected to the intra-car network N1 of the first car. Also in this case, the PPTP server VS1 of the first car and the original router R3 of the third car except for the PPTP server VS3 are not involved in the transmission of this packet, the PPTP server VS1 and the original router R3 being shaded in FIG. 11. In FIG. 11, in address information ad21 to ad23 contained the headers of the packets, the destination address is shown after "TO:," and the transmission source address is shown after "FROM:."

First, the apparatus A3 of the third car generates a packet addressed to the maintenance terminal 5 (maintenance software 5A) and sends the packet to the intra-car network 3N. The packet is transmitted to the PPTP server VS3 that has the same private IP address as the maintenance terminal 5.

The PPTP server VS3 newly adds a header (header containing the address information ad22), addressed to the first car, to the packet from known tunnel information and session information to generate the tunneling packet, and transmits the tunneling packet to the router R1 of the first car.

The router R1 of the first car processes the received tunneling packet by the NAT function, rewrites the destination address to the private IP address of the maintenance terminal 5, and sends the tunneling packet to the intra-car network N1 of the first car. At this time, only the header added as the tunneling packet is rewritten, and the original packet generated by the apparatus A3 is not rewritten. Therefore, only the address information ad22 is rewritten to the address information ad23.

The tunneling packet is sent through the intra-car network N1 of the first car to the maintenance terminal 5. The PPTP client VC removes the header of the tunneling packet, takes out the original packet generated by the apparatus A3, and transmits the packet to the maintenance software 5A.

As above, the maintenance terminal 5 (maintenance software 5A) and the apparatus A3 can communicate with each other as if they belong to the same intra-car network (local network). Similarly, the maintenance terminal 5 can communicate with all the apparatuses connected to the intra-car network N3 of the third car.

When updating the software (the operation programs and parameters of the maintenance target apparatus) of the controller of the maintenance target apparatus (apparatus A3, for example) as the maintenance work, the information for this update is transmitted from the maintenance terminal 5 to the maintenance target apparatus as the maintenance information. Further, when acquiring the log information, such as the operation log, from the controller of the maintenance target apparatus (apparatus A3, for example) as the maintenance work, the log information stored in a memory or the like regarding the operating state of the maintenance target apparatus is transmitted from the maintenance target apparatus to the maintenance terminal 5 as the maintenance information.

Similarly, the maintenance terminal 5 can communicate with all the apparatuses connected to the intra-car networks N1 and N2 and can transmit the maintenance information to and receive the maintenance information from the selected maintenance target apparatus.

It should be noted that the PPTP server (VS1 to VS3) does not necessarily have to be incorporated in the router (R1 to R3) to operate and may be configured to operate in a different independent apparatus.

As with Embodiment 1, according to the present embodiment, when performing the maintenance work, the maintenance worker does not have to directly connect the maintenance terminal 5 to the maintenance target apparatus. The maintenance worker carries the maintenance terminal 5 into a car (head car, for example) and can perform the maintenance work in this car with respect to all the apparatuses (including the monitoring devices) connected to the intra-car networks N1 to N3 as the maintenance targets without moving to the other cars. Thus, the maintenance work can be performed efficiently. Further, since the communication using the inter-car network NA while the train is normally running is limited to the communication among the monitoring devices, the increase in the traffic of the inter-car network NA can be suppressed, the labor of managing the NAT tables of the router R1 to R3 can be reduced, and the deterioration of the security can be suppressed.

When performing the communication in a case where the maintenance target apparatus is an apparatus in the car into which the maintenance terminal 5 has been carried, the maintenance terminal 5 may be connected by wire to the intra-car network (in the example of FIG. 4, the intra-car network N1 of the head car 1) of the car where the maintenance terminal 5 exists, and without using the PPTP, the maintenance terminal 5 may be configured as one apparatus constituting this intra-car network.

In Embodiments 1 and 2, the communication using the inter-car network NA while a train is normally running is applied only to the communication among the monitoring devices. However, Embodiments 1 and 2 are not limited to this. For example, when the communication using the inter-car network NA is limited to the communication among a small number of specific devices (monitoring devices, apparatuses), the increase in the traffic of the inter-car network NA can be suppressed to some extent, the labor of managing the NAT tables of the routers R1 to R3 can be reduced to some extent, and the deterioration of the security can be suppressed to some extent.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

The present invention is useful as, for example, a network system of a railcar, the network system being capable of: suppressing the increase in the traffic of the inter-car network; reducing the labor of managing the NAT tables;

suppressing the deterioration of the security; and efficiently performing the maintenance work.

REFERENCE SIGNS LIST 1 to 3 car
4 car train set
5 maintenance terminal (external terminal)
M1 to M3 monitoring device (first apparatus)
A1 to A3 apparatus (second apparatus)
N1 to N3 intra-car network
NA inter-car network
R1 to R3 router
AP1 to AP3 wireless LAN access point
AD wireless LAN adapter
VC PPTP client (VPN client)
VS1 to VS3 PPTP server (VPN server)

The invention claimed is:

1. A network system for a railcar and for use with an external terminal, the network system comprising:
   intra-car networks mounted on a plurality of respective cars of a car train set formed by coupling the plurality of respective cars together, the intra-car networks including at least a corresponding one of first apparatuses and a corresponding one of second apparatuses, the first and second apparatuses being connected to each of the intra-car networks, and the first and second apparatuses having private addresses;
   an inter-car network formed in the entire car train set for transmission and reception of information between the first and second apparatuses mounted on the plurality of respective cars;
   routers provided in the plurality of respective cars, each router being connected between the corresponding intra-car networks of the plurality of respective cars and the inter-car network, each router including a network address translation portion configured to perform address translation of mutually converting the private address of a respective first apparatus and an IP address of the inter-car network when performing the transmission and reception of the information between the first and second apparatuses mounted on the plurality of respective cars; and
   a maintenance transmission path forming unit configured to form a transmission path through which the transmission and reception of the information are performed between: (i) a maintenance target apparatus selected by the external terminal from the first and second apparatuses mounted on the plurality of respective cars, and (ii) the external terminal that is not connected by wire to the intra-car network where the maintenance target apparatus exists, the transmission path not passing through the network address translation portion of the respective car on which the maintenance target apparatus is mounted.

2. The network system according to claim 1, wherein:
   the maintenance transmission path forming unit includes:
      wireless LAN access points connected to the respective intra-car networks, and
      a wireless LAN adapter connected to or incorporated in the external terminal; and
   the maintenance transmission path forming unit forms the transmission path connecting the external terminal and the intra-car network, where the maintenance target apparatus exists, through the wireless LAN adapter and the corresponding wireless LAN access point.

3. The network system according to claim 1, wherein:
   the maintenance transmission path forming unit includes:
      a VPN client incorporated in the external terminal and connected to any one of the intra-car networks, and
      VPN servers provided in the plurality of respective cars, each of the VPN servers being connected between the corresponding intra-car network and the inter-car network; and
   the maintenance transmission path forming unit forms the transmission path connecting the external terminal and the intra-car network, where the maintenance target apparatus exists, through the VPN client and the corresponding VPN server.

4. The network system according to claim 1, wherein the external terminal updates software of the maintenance target apparatus through the transmission path formed by the maintenance transmission path forming unit.

5. The network system according to claim 1, wherein the external terminal receives an operation log of the maintenance target apparatus through the transmission path formed by the maintenance transmission path forming unit.

6. The network system according to claim 1, wherein:
   the first apparatuses of the plurality of respective cars are monitoring devices each configured to monitor a state of the corresponding second apparatus through the corresponding intra-car network; and
   transmission and reception of information regarding the state of the second apparatus are performed among the monitoring devices of the plurality of respective cars through the inter-car network.

7. A network system for a railcar and for use with an external terminal, the network system comprising:
   intra-car networks mounted on a plurality of respective cars of a car train set formed by coupling the plurality of respective cars together, the intra-car networks including at least a corresponding one of first apparatuses and a corresponding one of second apparatuses, the first and second apparatuses being connected to each of the intra-car networks, and the first and second apparatuses having private addresses;
   an inter-car network formed in the entire car train set for transmission and reception of information between the first and second apparatuses mounted on the plurality of respective cars;
   routers provided in the plurality of respective cars, each router being connected between the corresponding intra-car networks of the plurality of respective cars and the inter-car network, each router including a network address translation portion configured to perform address translation of mutually converting the private address of a respective first apparatus and an IP address of the inter-car network when performing the transmission and reception of the information between the first and second apparatuses mounted on the plurality of respective cars; and
   a maintenance transmission path forming network configured to form a transmission path through which the transmission and reception of the information are performed between: (i) a maintenance target apparatus selected by the external terminal from the first and second apparatuses mounted on the plurality of respective cars, and (ii) the external terminal that is not connected by wire to the intra-car network where the maintenance target apparatus exists, the transmission path not passing through the network address translation portion of the respective car on which the maintenance target apparatus is mounted.

8. The network system according to claim 7, wherein:
the maintenance transmission path forming network includes:
wireless LAN access points connected to the respective intra-car networks, and
a wireless LAN adapter connected to or incorporated in the external terminal; and
the maintenance transmission path forming network forms the transmission path connecting the external terminal and the intra-car network, where the maintenance target apparatus exists, through the wireless LAN adapter and the corresponding wireless LAN access point.

9. The network system according to claim 7, wherein:
the maintenance transmission path forming network includes:
a VPN client incorporated in the external terminal and connected to any one of the intra-car networks, and
VPN servers provided in the plurality of respective cars, each of the VPN servers being connected between the corresponding intra-car network and the inter-car network; and
the maintenance transmission path forming network forms the transmission path connecting the external terminal and the intra-car network, where the maintenance target apparatus exists, through the VPN client and the corresponding VPN server.

10. The network system according to claim 7, wherein the external terminal updates software of the maintenance target apparatus through the transmission path formed by the maintenance transmission path forming network.

11. The network system according to claim 7, wherein the external terminal receives an operation log of the maintenance target apparatus through the transmission path formed by the maintenance transmission path forming network.

12. The network system according to claim 7, wherein:
the first apparatuses of the plurality of respective cars are monitoring devices each configured to monitor a state of the corresponding second apparatus through the corresponding intra-car network; and
transmission and reception of information regarding the state of the second apparatus are performed among the monitoring devices of the plurality of respective cars through the inter-car network.

* * * * *